United States Patent

[11] 3,543,881

[72] Inventor Ronald F. Obergefell
Cleveland, Ohio
[21] Appl. No. 790,814
[22] Filed Jan. 13, 1969
[45] Patented Dec. 1, 1970
[73] Assignee Houdaille Industries, Inc.
a corporation of Delaware

[54] FLUID DISTRIBUTOR MEANS
6 Claims, 6 Drawing Figs.

[52] U.S. Cl..................................................... 184/7,
222/249
[51] Int. Cl................................................ F16n 25/02
[50] Field of Search............................................ 184/7,
7(C1), 7(C2), 7(C3); 222/249.250, 219; 137/596

[56] References Cited
UNITED STATES PATENTS
2,718,281 9/1955 Harter........................... 184/7
2,834,433 5/1958 Higgens......................... 184/7
3,298,460 1/1967 Porter et al. ................... 184/7
3,438,463 4/1969 Gruber........................... 184/7

Primary Examiner—Manuel A. Antonakas
Attorney—McNenny, Farrington, Pearne and Gordon ABSTRACT: A distributor for a lubrication system that supplies lubricant from a supply source to several stations and proportions the supplied lubricant between the several stations to branch lines that communicate between the distributor and the stations to be lubricated. The distributor includes a single cylinder block having a plurality of valve and plunger members therein. Member-to-member interconnecting passageways are at least in part defined by a manifold block which is fixed to and extends along the member-to-member extent of the cylinder block in face-to-face engagement therewith.

Patented Dec. 1, 1970

3,543,881

INVENTOR
RONALD F. OBERGEFELL
BY
McNENNY, FARRINGTON, PEARNE & GORDON
ATTORNEYS

FLUID DISTRIBUTOR MEANS

BACKGROUND OF THE INVENTION

Single-line series or sequential-type lubricant distributors for lubrication systems are sometimes referred to as cycling or cyclic distributors. They supply lubricant from a supply source to several stations and proportion the supplied lubricant between the several stations through lubricant branch lines that communicate between the distributor and the stations to be lubricated. Distributors of this type have a plurality of valve-and-plunger units and interconnections are made between the valve means of each valve-and-plunger unit and the piston chamber of another valve-and-plunger unit. The interconnections are accomplished through conduit means leading from unit to unit in such a manner as to provide for cyclic sequential operation of the units of the distributor and cyclic sequential discharge of measures of lubricant to the branch lines. Examples of distributors of this general type in the prior art are found in U.S. Pat. Nos. 2,792,911; 2,834,433; 3,025,929; and 3,074,509.

Lubricant distributors of the type set forth above require complex and precise drilling operations to provide interconnections between the valve means of each valve-and-plunger unit of the distributor and piston chambers of another valve-and-plunger unit of the distributor. Thus, while many improved lubricant distributors have been proposed, such systems have not been satisfactory in some potential applications because of the expense involved in complex machining operations which are required to provide the necessary unit-to-unit passageways.

SUMMARY OF THE INVENTION

This invention overcomes many of the machining operations that are required in many sequential-type lubricant distributors, thus making such distributors economically feasible without altering their intended function.

According to this invention, a distributor for a lubrication system is fabricated by providing an inexpensive die casting having portions of connecting passageways formed therein. The die casting is then machined by drilling, broaching, and honing cylinder chambers therein so that the cylinder chambers communicate with the passageways of the casting. These passageways form portions of interconnecting conduits between the cylinder chambers of the casting. A die-cast manifold block is formed with grooves on one face thereof and the manifold block is fixed to the cylinder block so that the grooves and one face of the cylinder block define the remaining portions of the interconnecting passageways between the cylinder chambers. Thus, the interconnecting passageways are easily formed by die-casting techniques.

DESCRIPTION OF THE PREFERRED EMBODIMENT

Figure 1:
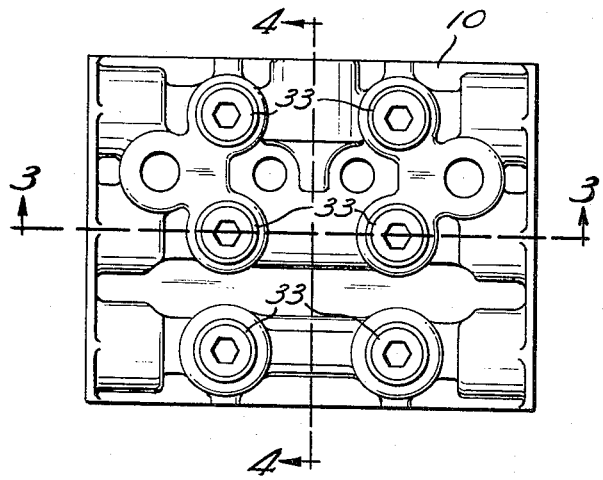
FIG. 1 is an elevational view of a single line series or sequential-type lubricant distributor embodying the invention.
Figure 2:
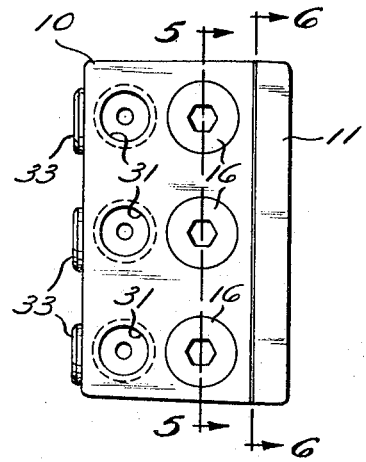
FIG. 2 is a view of the right end face of the distributor illustrated in FIG. 1.

As is shown in FIGS. 1 and 2, the lubricant distributor according to this invention comprises a single cylinder block 10 and a manifold block 11. The cylinder block 10 includes valve-and-plunger members 12, 13, and 14. Each member 12, 13, and 14 comprises a bore 15 having its end closed by threaded plugs 16. Each member 12, 13, and 14 further includes a plunger 17 having end pistons 18 and 19 and intermediate lobes 20 and 21. Each piston 18 and 19 is in its own one of hydraulic piston chambers 22 and 23 and is in lubricant sealing sliding relationship with the chamber. Each unit also includes valve means constituted by the portions of the lobes 20 and 21 of the plungers 17, which register in different ways with valve ports opening into the bores in which the plunger and valving means are received.

Figure 3:
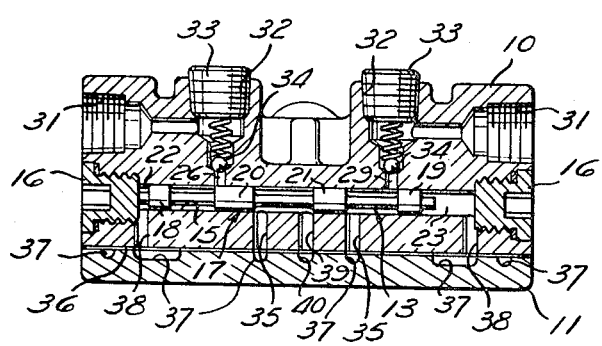
FIG. 3 is a cross-sectional view, the plane of the section being indicated by the line 3–3 in FIG. 2.
Figure 4:
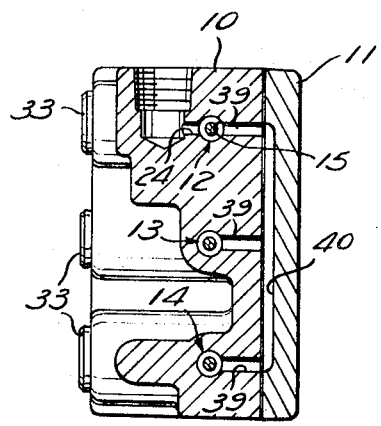
FIG. 4 is a cross-sectional view of the distributor, the plane of the section being indicated by the line 4–4 in FIG. 1.
Figure 5:
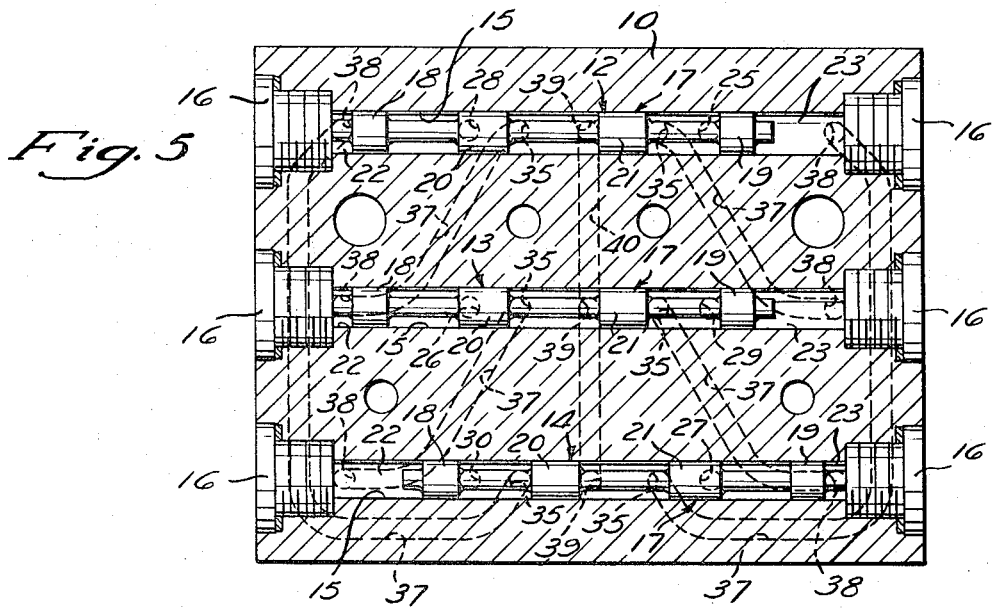
FIG. 5 is a cross-sectional view of the distributor, the plane of the section being indicated by the line 5–5 in FIG. 2.
Figure 6:
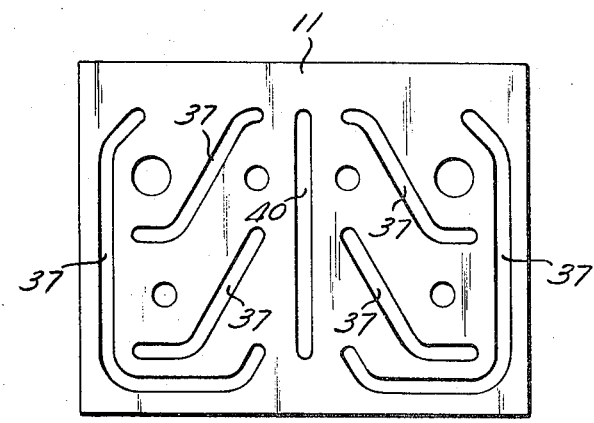
FIG. 6 is a cross-sectional view of the distributor, the plane of the section being indicated by the line 6–6 in FIG. 2.

A header passage 24 (FIG. 4) communicates with the topmost bore 15 illustrated in FIGS. 4 and 5. With the parts in the position shown, as lubricant is fed into the header passage 24, it will be distributed sequentially and in a different proportion to outlet valve ports 25, 26, 27, 28, 29, and 30 in the same sequence as the outlet valve ports are numbered. As may be seen most clearly in FIG. 3, the valve ports 25—30 have alternate outlet ports 31 and 32. In the illustrated embodiment, the outlet ports 32 are blocked by threaded plugs 33 and the ports 31 are open for connection to distribution lines. If desired, there may be provided outlet check valves 34 between the valve ports 25—30 and the outlets 31 and 32.

The members 12, 13, and 14 of the cylinder block 10 each have ports 35. As may be seen most clearly in FIG. 3, the ports 35 are formed in the cylinder block 10 and extend from one face 36 thereof and into the bores 15. The ports 35 communicate with in-out lines 37, which are in part defined by cast grooves in the manifold block 11 and in part by the face 36 of the cylinder block 10. Each passage 37 extends between one of the ports 35 in one of the members 12—14 to a port 38 in the cylinder chamber 22 or 23 of another one of the members 12—14. As to two such members 12—14 connected by a passageway 37, the member having the valve port 35 may be considered the controller member and the member having the port 38 may be considered the controlled member.

Each member 12—14 includes a port 39, and each port 39 is connected to the other ports 39 by a passageway 40 which is in part defined by a cast groove in the manifold block 11 and in part by the face 36 of the cylinder block 10. The ports 39 are in constant communication with the header passageway 24, since the lobes 20 and 21 do not block the ports 39.

Lubricant is sequentially metered through one of the outlet ports 25—30 when lubricant enters a port 35 in a controller member and flows into a cylinder chamber 22 or 23 in a controlled member to move a plunger 17 in the controlled member from one of its endmost limiting positions to its other endmost limiting position. Lubricant is thus expelled from one of the cylinder chambers 22 or 23 in the controlled member through an in-out line 37 to a port 35 in the controller member and then out through one of the outlet ports 25—30.

As may be seen in the drawings, the ports 35, 38, and 39 are all formed in the block 10 by the die-casting operation, and extend into the bores 15 from one face of the cylinder block 10. This construction eliminates complex machining operations that would be required if member-to-member passageways were provided in the cylinder block 10. Such member-to-member passageways are formed by cast grooves in one face of the manifold block 11 which meets with the face 36 of the cylinder block 10. The blocks 10 and 11 may be securely fastened together by bolts (not shown) and/or may be sealed in face-to-face engagement by, for example, a suitable epoxy cement. Since the cylinder block 10 and manifold block 11 are unitary blocks which are securely fastened together, there is little if any tendency for these blocks to be separated by high-pressure lubricant.

The invention is not restricted to the slavish imitation of each and every detail set forth above. Obviously, lubricant distributors may be provided which change, eliminate, or add certain specific details without departing from the scope of the invention.

I claim:

1. In a single-line series of sequential-type lubricant distributor for a lubrication system that supplies lubricant from a supply source to several stations and proportions the supplied lubricant between the several stations, the system having branch lines that communicate between the distributor and the stations to be lubricated, wherein the distributor comprises cylinder block means having a plurality of bores therein defining cylinder chambers, a valve-and-plunger means in each cylinder chamber, each said cylinder chamber and each said valve-and-plunger means comprising a valve-and-plunger member, and wherein interconnections between valve means of each valve-and-plunger member of the distributor and piston chambers of another valve-and-plunger member of the distributor are accomplished through conduit means leading from member to member, said interconnections being for sequential operation of said members of the distributor and discharge of measures of lubricant to the branch lines, the improvement wherein said cylinder block comprises a single block, wherein manifold block means is fixed to and extends along the member-to-member extent of said single cylinder block in face-to-face engagement therewith, and wherein portions of said member-to-member interconnecting conduit means are at least in part defined by said manifold block means.

2. In a single-line series or sequential-type lubricant distributor for a lubrication system that supplies lubricant from a supply source to several stations and proportions the supplied lubricant between the several stations, the system having branch lines that communicate between the distributor and the stations to be lubricated, wherein the distributor comprises cylinder block means having a plurality of bores therein defining cylinder chambers, valve-and-plunger means in each cylinder chamber, each said cylinder chamber and each said valve-and-plunger means comprising a valve-and-plunger member, and wherein interconnections between valve means of each valve-and-plunger member of the distributor and piston chambers of another valve-and-plunger member of the distributor are accomplished through conduit means leading from member to member, said interconnections being for sequential operation of said members of the distributor and discharge of measures of lubricant to the branch lines, the improvement wherein said cylinder block comprises a single block, wherein portions of said member-to-member interconnecting conduit means are at least in part defined by manifold block means which is laterally displaced with respect to said valve-and-plunger members.

3. In a single-line series or sequential-type lubricant distributor for a lubrication system that supplies lubricant from a supply source to several stations and proportions the supplied lubricant between the several stations, the system having branch lines that communicated between the distributor and the stations to be lubricated, wherein the distributor comprises cylinder block means having a plurality of bores therein defining cylinder chambers, valve-and-plunger means in each cylinder chamber, each said cylinder chamber and each said valve-and-plunger means comprising a valve-and-plunger member, and wherein interconnections between valve means of each valve-and-plunger member of the distributor and piston chambers of another valve-and-plunger member of the distributor are accomplished through conduit means leading from member to member, said interconnections being for sequential operation of said members of the distributor and discharge of measures of lubricant to the branch lines, the improvement wherein said cylinder block comprises a single block, wherein portions of said member-to-member interconnecting conduit means are defined by passages which extend from one face of the cylinder block to said bores, and wherein other portions of said interconnecting conduit means are at least in part defined by manifold block means which is fixed to and extends along the member-to-member extent of said cylinder block in face-to-face engagement therewith.

4. The improvement according to claim 3 wherein said other portions of said interconnecting conduit means are in part defined by said one face of said cylinder block and in part defined by surface grooves in said manifold block.

5. The improvement according to claim 4 wherein the passages which extend from one face of the cylinder block to said bores are normal to the axes of said bores.

6. A method of making a lubricant distributor which comprises a cylinder block means having a plurality of bores therein defining cylinder chambers, valve-and-plunger means in each cylinder chamber, each said cylinder chamber and each said valve-and-plunger means comprising a valve-and-plunger member, and wherein interconnections between valve means of each valve-and-plunger member of the distributor and piston chambers of another valve-and-plunger member of the distributor are accomplished through conduit means leading from member to member, said interconnections being for sequential operation of said members of the distributor and discharge of measures of lubricant to branch lines, comprising the steps of simultaneously forming portions of said member-to-member interconnecting conduit means in a single cylinder block so that said conduit means extend into the cylinder block from one face thereof, forming other portions of said interconnecting conduit means in manifold block means, and fixing said manifold block means to said one face of said cylinder block so that the conduit means in said cylinder block communicate with the conduit means in said manifold block means.